United States Patent [19]
Hodges

[11] Patent Number: 4,721,541
[45] Date of Patent: Jan. 26, 1988

[54] CERAMIC DIFFUSION BONDING METHOD

[75] Inventor: L. Reese Hodges, Clearwater, Fla.

[73] Assignee: Trak Microwave Corporation, Tampa, Fla.

[21] Appl. No.: 780,690

[22] Filed: Sep. 26, 1985

[51] Int. Cl.$^4$ .............................................. B32B 31/20
[52] U.S. Cl. ...................................... 156/89; 156/257; 264/67
[58] Field of Search ............ 156/89, 257; 264/56, 58, 67; 228/121, 165, 171, 174, 193, 196

[56] References Cited

U.S. PATENT DOCUMENTS

| | | | |
|---|---|---|---|
| 2,717,225 | 9/1955 | Williams | 156/89 |
| 3,311,522 | 3/1967 | Ladd et al. | 156/89 |
| 3,725,186 | 4/1973 | Lynch | 156/89 |
| 3,770,529 | 11/1973 | Anderson | 156/89 |
| 4,156,051 | 5/1979 | Nakamura et al. | 156/89 |
| 4,369,154 | 1/1983 | Dougherty | 264/63 |
| 4,396,445 | 8/1983 | Sasaki et al. | 156/89 |
| 4,406,722 | 9/1983 | Chow et al. | 156/89 |
| 4,472,333 | 9/1984 | Ohtani | 264/67 |
| 4,486,257 | 12/1984 | Ebata et al. | 156/325 |
| 4,487,644 | 12/1984 | Gupta et al. | 156/89 |

OTHER PUBLICATIONS

"Diffusion Bonding of Ceramics", Curtis Scott and Van Bao Tran, Am. Ceram. Bull., 64[8] 1129-31 (1985).

*Primary Examiner*—Caleb Weston
*Attorney, Agent, or Firm*—Dominik, Stein, Saccocio & Reese

[57] ABSTRACT

Unfired ceramic bodies which are to be joined together, are separately fired to the point of optimum density. The surfaces to be joined are machined to remove surface irregularities, lapped and polished. At least one of the two surfaces is machined to provide a desired cavity configuration. The polished surfaces are then juxtaposed and fired to the maturing temperature of the ceramic involved. A weight may be used to maintain the desired juxtapositioning. The outer surfaces of the now integral ceramic body are then machined to desired dimensions.

18 Claims, 5 Drawing Figures

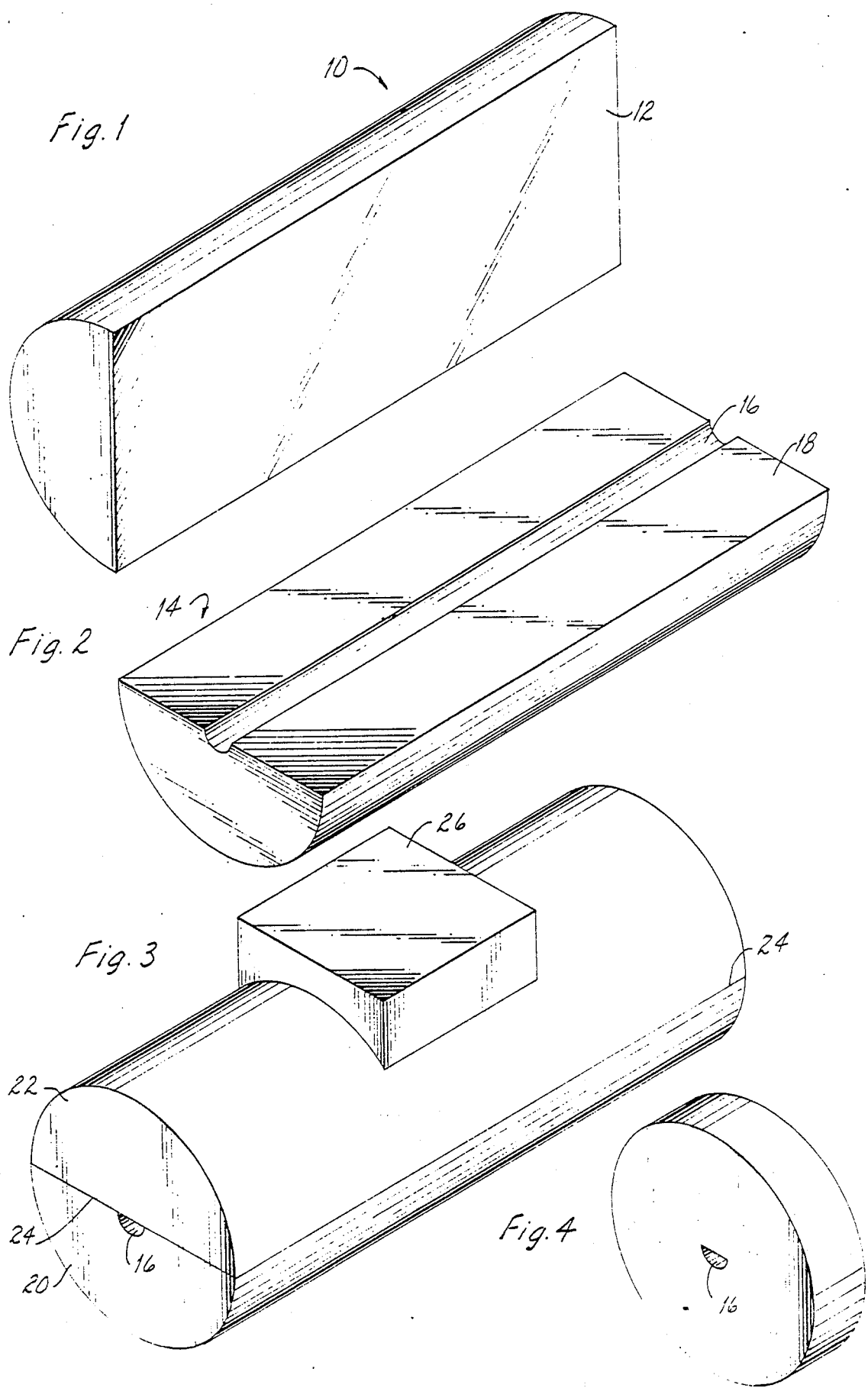

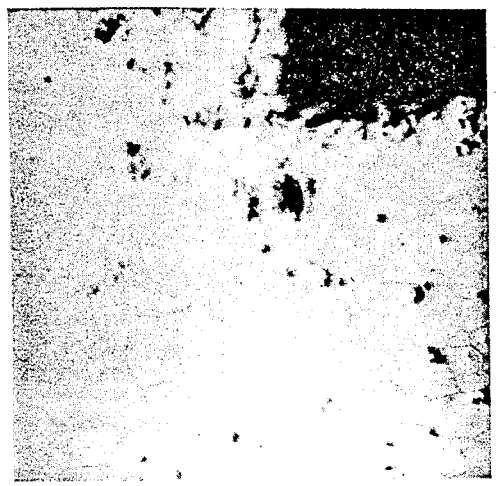
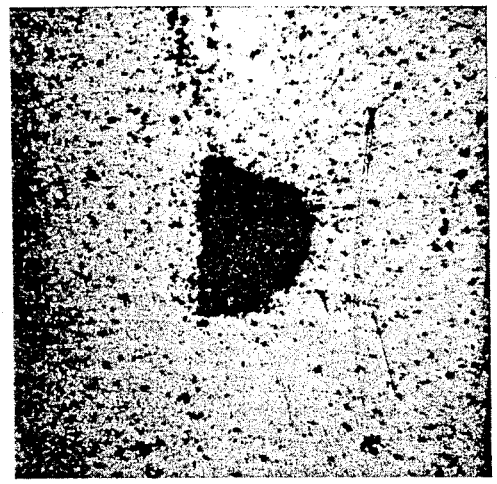
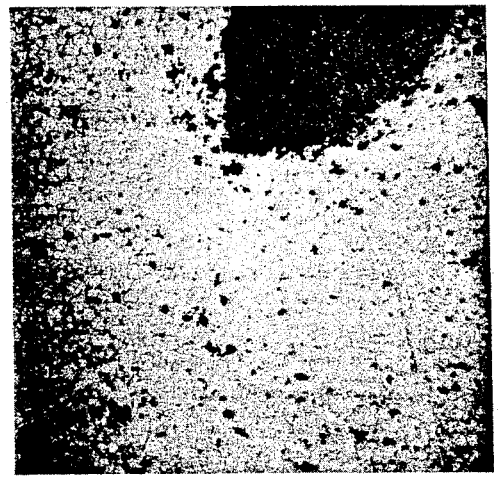
FIG.5

CERAMIC DIFFUSION BONDING METHOD

BACKGROUND OF THE INVENTION

1. Field of the Invention

This invention relates generally to a method for diffusion bonding of ceramics, and in particular to a method for forming internal cavities of small dimensions in ceramics by bonding ceramic bodies together.

2. Description of the Background Art

Ceramic microwave components such as phase-shifters and latching switches for use in microwave devices utilize shapes such as toroidal configurations having internal cavity dimensions which are dictated in part by the frequency of the microwaves with which the components are to be used. As present technology advances toward very high frequencies, holes are required in the ceramics having diameters on the order of 0.05 centimeters or less. When such small diameter holes are required with lengths greater than 0.6 cm., it has been found that conventional methods will not reliably produce the desired parts. Such methods include drilling with diamond tipped tools, pressing ceramic powder around a mandrel which is removed before final firing, pressing powder around a burnout insert which is consumed during firing, and laser cutting and drilling of previously fired ceramic masses. These techniques, while useful, especially where small dimensions are not necessary, produce such shortcomings as warping during forming and firing which causes unacceptable dimensional variances. In addition, cracking of parts during firing causes parts to be rejected as unusable after they have been machined. Moreover, intricate shapes are not attainable, and, as pointed out above, holes of small diameter are difficult, if not impossible to produce except in short lengths.

Therefore, it is an object of this invention to provide a method which overcomes the aforementioned inadequacies of the prior art methods and provides an improvement which is a significant contribution to the advancement of the ceramic arts.

Another object of this invention is to permit the forming of cavity configurations in a ceramic body having dimensions usable for microwave components.

It is also an object of this invention to provide a method which will result in a higher percentage of usable parts when small internal cavity configurations are incorporated.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is a method wherein the desired cavity configuration is formed on a polished, flat surface of one piece of ceramic which has already been fired to the point of optimum (greater than 95% of X-ray) density. The desired cavity configuration may be formed by machining or, in the case of more intricate shapes, by using a pantograph machine or laser. This surface is then placed in intimate contact with a similarly sized flat, polished surface of a second piece of ceramic and the two pieces are then fired to their maturing temperature, thereby forming a unitary ceramic body containing the desired cavity configuration. Large numbers of patterns may be formed on a single ceramic piece, and, after bonding to the second piece, individual patterns may be sliced off. Unless the mating surfaces are flat with respect to one another on the order of two light bands, pressure may be applied to maintain the desired juxtapositioning of the two ceramic pieces during firing.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific method disclosed may be readily utilized as a basis for modifying or designing other methods for carrying out the same purposes of the present invention. It should also be realized by those skilled in the art that such equivalent methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 represents a ceramic body partially prepared in accordance with the invention;

FIG. 2 represents a ceramic body at a further stage of preparation in accordance with the invention;

FIG. 3 represents ceramic bodies positioned for further processing in accordance with the invention;

FIG. 4 shows a completed toroid formed in accordance with the invention; and

FIG. 5 is a photomicrograph of a toroid fabricated in accordance with the invention.

Similar reference characters refer to similar parts through the several views of the drawings.

DETAILED DESCRIPTION OF THE INVENTION

Fabrication of ceramic members which will have desired dimensions when completed is difficult, particularly when powdered ceramic materials are being formed by sintering. A lack of uniformity in packing density and uneven rates of heating tend to cause distortion during firing. With some products, forming processes such as the machining of external shapes may be performed after firing. Internal cavity configurations, traditionally formed by molding techniques, are not readily achieved after firing where small dimensions are involved.

The present invention overcomes the problem of distortion during firing by performing machining or other forming operations after the ceramic body has already been fired sufficiently to reach optimum density. Optimum density, as used herein, is density in excess of 90 percent of theoretical maximum density.

FIG. 1 shows ceramic body 10 which has been pressed into the general configuration illustrated and then fired to reach optimum density. After this firing, surface 12 of body 10 was next machined to remove surface irregularities. Surface 12 was then lapped to obtain a flat surface and then polished to a mirror finish using 1 μm grain size diamond abrasive or other suitable abrasive.

FIG. 2 shows ceramic body 14 which has already undergone the process steps of body 10 of FIG. 1. In addition, groove 16 has thereafter been formed in the flat, polished face 18. Groove 16 may be formed using any well known techniques for forming in ceramic bodies which have been fired, such as sawing with diamond tipped saws, using laser or electron beams, etc. Where a simple groove such as that shown in FIG. 2 is all that is necessary, sophisticated guidance mechanisms may not be necessary. For more intricate or elaborate cavity configurations, pantograph machines, or masking techniques may be necessary.

Referring next to FIG. 3, as the next step in the process, the flat, polished surface of ceramic body 20, which has been prepared as described with respect to FIG. 2 so as to have a desired cavity configuration, is placed in intimate contact with the flat, polished surface of ceramic body 22, which has been prepared as described with respect to FIG. 1. Typically, both body 20 and body 22 will be formed to have matching edges at the surface interface 24, and these edges will be aligned. The thus assembled part is placed on a firing tray and positioned in a furnace.

It is important to maintain the desired juxtapositioning of the bodies while they are in the furnace. One method for achieving this is to assure that the mating surfaces are flat with respect to one another on the order of two light bands, and then mating the surfaces together in such manner that air is forced out of the mating surfaces. The bodies will then remain in proper juxtaposition during later firing to maturing temperature. Another method of achieving this is to use a weight 26 equivalent to 50 grams per square centimeter of mating polished surface. These weights may be made of Al2O3 or other non-reactive materials.

The part is then fired to the maturing temperature for the compound used in forming the part. In the case of yttrium iron garnet, the temperature is 1475 degrees centigrade. Detrimental effects to the material characteristics may occur due to vaporization if too long a firing time is used. To eliminate overfiring, the total firing time for the compound should not be exceeded. Thus, the time required for the initial firing to achieve optimum density and the time for firing to the maturing temperature should total the recommended firing time for the compound.

Referring to FIG. 4, the completed part is represented. The final processing steps involve machining the outer surfaces of the integrally formed ceramic body to the desired dimensions, and if multiple parts are to be obtained from the integrally formed ceramic body, slicing off the appropriate portion. Thus, as shown in FIG. 4, a ceramic toroid may be obtained.

The microstructure of the joined surfaces is shown in the photomicrograph of FIG. 5. A slight increase in the number of pores may be observed along the bonding plane as compared to the number of pores in the rest of the material. The quantity of pores is reduced as the surface finish and parallelism of the welding plane is improved. The more intimate the surface contact, the fewer pores are produced. The crystal size and shape at the interface are identical, confirming a bond produced by surface atoms melding together across the polished interfaces.

This formation of crystal structure across the interface is important not only for structural strength, but it also reduces discontinuities or pores which would interfere with the continuous arrangement of magnetic moments around the toroid, thereby producing higher remanent characteristics. Through the use of the present process, machining of the desired cavity configuration after firing of the ceramic mass has eliminated the pressing fluctuations by molecular transport (crystal growth) and has swept away the voids. The part has obtained a uniform density; and, if it is properly supported during subsequent firings, no further deformation or shrinkage will occur. The stabilization of this warpage and shrinkage contribute significantly to the dimensional stability of the resulting part.

Testing has proved that garnets, ferrites, and dielectrics ($BaTi_xO_y$) are suitable ceramics that can be bonded according to the method of the invention. More specifically, it is contemplated that all garnets could be bonded according to the method of the invention. Cubic ferrites including all lithium ferrites and ferrites with substitution of aluminum, titanium, manganese, copper, and other metal ions should bond according the method of the invention, whereas cubic ferrites including nickel ferrites with aluminum substitution, nickel ferrites (unless zinc is added) and manganese magnesium ferrites should not. All hexagonal ferrites should be capable of being bonded by the method. Finally, dielectrics including magnesium titanates and silicates should be capable of being bonded, whereas aluminum oxides should not. The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the method may be resorted to without departing from the spirit of the invention.

Now that the invention has been described, what is claimed is:

1. A process for forming a ceramic member having a desired cavity configuration comprising the steps of:
   firing first and second bulk ceramic masses to the point of optimum density;
   forming a flat surface on each of said masses;
   polishing said flat surfaces;
   forming in at least one of said polished, flat surfaces a desired cavity configuration;
   placing said polished, flat surfaces of said bulk ceramic masses against each other; and
   firing the ceramic masses to their maturing temperature; whereby an integral ceramic member having a desired cavity configuration is formed.

2. The process in accordance with claim 1 further including the step of:
   forcing said ceramic masses together while firing them to their maturing temperature.

3. The process in accordance with claim 1, wherein the step of forming a flat surface on each of said masses comprises the step of forming a flat surface on each said masses such that the flat surfaces are flat within two light bands.

4. The process in accordance with claim 1 wherein:

the step of forming a flat surface is performed by first machining the surface to remove surface irregularities, and then lapping the machined surface to a flat surface.

5. The process in accordance with claim 1 further including:
machining the exterior surfaces of said integral ceramic member to the desired dimensions.

6. The process in accordance with claim 1 wherein:
said ceramic masses are composed of yttrium iron garnet.

7. The process in accordance with claim 1, wherein:
said ceramic masses are composed of a garnet.

8. The process in accordance with claim 1, wherein:
said ceramic masses are composed of a ferrite.

9. The process in accordance with claim 8, wherein:
said ferrite comprises lithium ferrite and ferrite with substitution of aluminum, titanium, manganese, copper, and other metal ions.

10. The process in accordance with claim 8, wherein:
said ferrite comprises hexagonal ferrites.

11. The process in accordance with claim 1, wherein:
said ceramic masses are composed of a dielectric including magnesium titanate and magnesium silicate.

12. The process in accordance with claim 2 wherein:
said masses are forced together by a weight of 50 grams per square centimeter of interface area.

13. The process in accordance with claim 12 wherein:
said weight is made of aluminum oxide.

14. A process for forming a yttrium iron garnet toroid having a central opening diameter of 0.05 cm or less comprising:
forming similar first and second semicylindrical unfired yttrium iron garnet bodies;
firing said bodies to the point of optimum density;
machining the uncurved longitudinal surfaces to remove surface irregularities;
lapping the machine surfaces to produce flat surfaces;
polishing said flat surfaces;
forming in at least one of said polished, flat surfaces a longitudinally extending groove having a transverse dimension of 0.05 cm or less;
placing said polished, flat surfaces of said bodies in juxtaposition;
maintaining the juxtapositioning of said bodies with an aluminum oxide weight of 50 grams per square centimeter of flat surface interface;
firing the juxtaposed bodies to a temperature of 1475 degrees centigrade;
cooling the now integral body;
machining the exterior surface of the body to the desired dimensions; and
slicing transversely through said body to produce the desired thickness of the toroid.

15. A process for forming a ceramic part having a desired internal cavity configuration comprising:
pressing ceramic powder into a first form wherein one surface will be at the location of the desired internal cavity configuration;
firing said first ceramic form until warping and shrinkage are complete;
forming a flat, polished finish on said one surface of said first ceramic form;
forming said desired internal cavity configuration on said flat, polished surface of said first ceramic form;
pressing ceramic powder into a second form having one surface which will mate with said one surface of said first ceramic form;
forming a flat, polished finish on said one surface of said second ceramic form;
placing said flat, polished surfaces into juxtaposition; and
firing the juxtaposed forms to their maturing temperature.

16. The process in accordance with claim 15 further including the step of:
forcing said first and second ceramic forms together while firing them to their maturing temperature.

17. The process in accordance with claim 16 wherein:
said first and second ceramic forms are forced together by a weight of 50 grams per square centimeter of flat surface interface.

18. A process in accordance with claim 17 wherein:
said weight is made of aluminum oxide.

* * * * *